April 12, 1938. H. GORRIAS 2,113,726
HAT TREATING APPARATUS
Filed Jan. 11, 1937
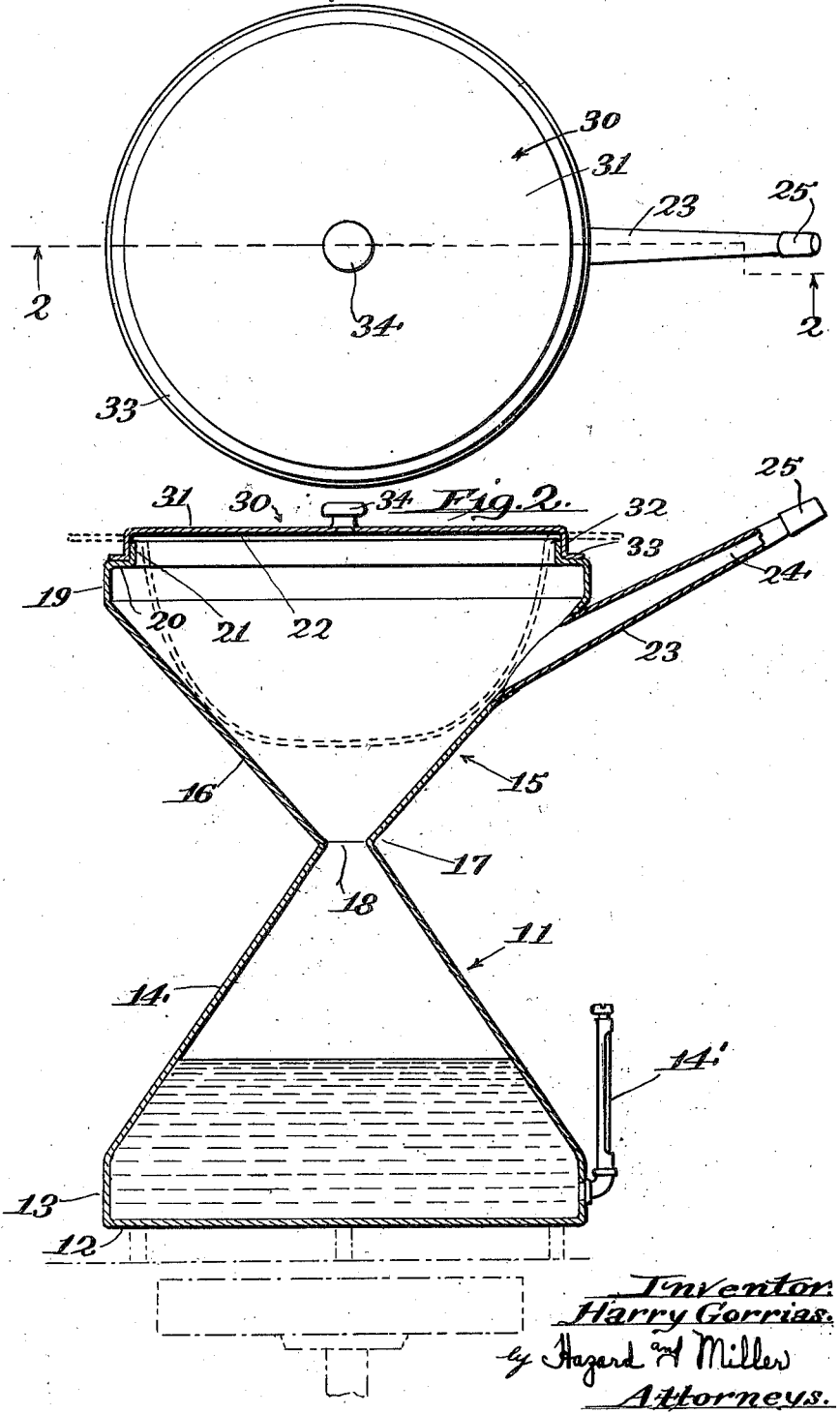
Inventor
Harry Gorrias.
by Hazard and Miller
Attorneys.

Patented Apr. 12, 1938

2,113,726

UNITED STATES PATENT OFFICE 2,113,726

HAT TREATING APPARATUS

Harry Gorrias, Los Angeles, Calif.

Application January 11, 1937, Serial No. 120,015

1 Claim. (Cl. 223—51)

My invention relates to a hat steaming apparatus, sometimes designated as a hat steaming kettle. In steaming hats, such as felt or straw, it is quite the common practice to have a device similar to a kettle in which water is boiled, such kettle having a large opening at the top so that the crown of a hat may be inserted in this opening and subjected to the action of the steam, the kettle with the hat being placed over a burner. This type of device has certain disadvantages in that an excessive amount of water is sometimes carried upwardly by the steam and causes the hat to be dampened to too great an extent. In addition, the water boils away comparatively quickly as a large proportion of the steam escapes from the so-called kettle and moreover there is no structure to cause a condensation of the steam and to return the water from condensation to the boiling water in the bottom of the kettle.

An object and feature of my invention is an apparatus for steaming hats or the like in which I provide in effect two distinct vessels connected together, one of which is for containing and boiling the water and the other for subjecting the hat to the steam, the steam passing upwardly through a contracted neck to the steaming vessel. A further feature of my invention is positioning and retaining the hat in the steaming portion of the vessel by resting the rim of the hat on the top of the steaming device with the crown extending downwardly. This results in saving of time in the replenishment of the water in the steaming vessel.

Also a further object and feature of my invention is making the lower or water boiling vessel in the shape of a frustum of a cone with the apex upwardly and making the steaming portion of the vessel also as a frustum of a cone with the apex downwardly, the two apices being connected at a contracted neck. Thus the inwardly sloping walls of the steam generator condense a certain amount of the steam causing the water to return to the bottom of the generator and comparatively dry steam flow upwardly through the neck to the steaming vessel. Where there is excess water in the steaming vessel a certain amount of this is condensed on the downwardly sloping sides of the upper part of the structure which is quite remote from the heat and is returned by flowing downwardly through the contracted neck to the steam generator. Another feature of my invention includes a spout connected to the upper part of the steaming vessel, this having a removable cap so that when it is desired to steam the rim, the cover may be replaced and thus retain the steam in the steaming vessel so that it is forced outwardly through the spout and hence brought into contact with the rim of the hat which is manipulated over the discharge end of the spout.

My invention is illustrated in connection with the accompanying drawing, in which:

Fig. 1 is a plan taken in the direction of the arrow 1 of Fig. 2.

Fig. 2 is a vertical section on the line 2—2 of Fig. 1 in the direction of the arrows.

In the drawing the steam generator portion of my invention designated by the numeral 11 has a flat base 12 and a cylindrical wall 13 and conical sides 14 forming a frustum of a cone. A water level gauge 14' is connected to the wall 13. The steaming portion of the vessel 15 also has conical sides 16 forming a frustum of a cone diverging outwardly and upwardly. The sides 14 and 16 are connected at a neck portion 17. Thus there is a narrow internal throat 18. An annular rim 19 preferably formed cylindrical extends upwardly from the outer and upper periphery of the wall 16. A horizontal inturned top 20 extends inwardly and has an upwardly turned flange 21, this flange defining a circular opening 22. A spout 23 is connected to the side 16 and extends laterally and upwardly, preferably having a contracted discharge end 24 above the top 20, thus discharging steam for steaming the rims of hats well above the top of the steaming vessel. A removable cap 25 which may be threaded on the outer end of the spout forms a closure for such spout when steaming a hat.

A heavy cover 30 has a circular top portion 31 and a downwardly extending rim 32 with a horizontal flange 33. A lifting knob 34 is provided. This cover fits on the horizontal inturned top 20 and has a close fit with the upwardly turned flange 21.

In using my invention for steaming the crown or main portion of a hat the cap 25 is applied to the end of the spout. The requisite amount of water is placed in the steam generator bottom portion 11, the surface of the water however should be well below the contracted throat 18. The cover 30 is removed and the hat placed with the crown extending into the upper or steaming portion 15 of the vessel, the lid is left removed and the hat merely rests on the upwardly turned flange 21 engaging the projecting rim or other portion of the hat. The dotted lines of Fig. 2 show the approximate position of the hat.

The steam generator portion may be heated by a burner such as a gas burner or the like, producing steam which passes upwardly through the narrow throat 18. A certain amount of this steam contacts the conical sides 14 and the excessively wet steam will condense or collect on such sides and run downwardly into the water at the bottom. The steam diverges after passing upwardly through the throat 18 and envelops the crown of the hat extending downwardly in this upper portion of the vessel. If a certain amount of the steam carries free water through the throat, this steam in spreading out or expanding in the cone-shaped steaming portion 15 causes a vaporization of the drops of free water so that the hat is subjected to the steam without being submerged in a volume of excessively wet vapors. This insures the proper and desirable steaming of the hat without undue saturation. In view of the conical sides 16 being subjected to external temperature and spaced a considerable distance above the burner this surface is comparatively cool causing a certain condensation of the steam, the water condensation running downwardly and dropping into the throat 18 to the water in the steam generator. This insures a certain conservation of the water so that it is not necessary to replenish this as frequently as with the ordinary steaming kettles.

When it is desired to steam the rim or other portions of the hat not subjected to steam in the steam chamber after removal of the hat from such chamber the cover 30 is replaced. This has a sufficiently close joint to prevent escape of steam. The removable cap 25 is taken from the spout and steam is ejected through the spout so that by manipulating the heat the brim or other parts may be subjected to the steam jet. This steams these parts much in the ordinary manner.

Various changes may be made in the details of the construction without departing from the spirit or scope of the invention as defined by the appended claim.

I claim:

A hat treating apparatus comprising a vessel having a steam generator portion with a flat circular base with a cylindrical wall immediately thereabove with a conical side wall extending above the cylindrical wall and forming a frustum of a cone, the upper portion of the vessel having a steaming portion with a conical side wall forming a frustum of a cone inverted, the said two cones being connected by a neck defining an internal circular valveless throat, the upper cone having an inturned top with an opening whereby a hat may be inserted through said opening into the upper portion of the vessel and with the brim of the hat adapted to extend over the inturned top, the conical sides of the steaming portion of the vessel being adapted to confine the steam closely to the crown of a hat and the steam generator portion being adapted to contain water, the center of the base, the throat and the opening at the top being in axial alignment.

HARRY GORRIAS.